United States Patent [19]

Sano et al.

[11] Patent Number: 5,143,353
[45] Date of Patent: Sep. 1, 1992

[54] METHOD FOR LAYING OPTICAL FIBER UNIT AND APPARATUS THEREFOR

[75] Inventors: Hiroaki Sano; Yoshiaki Terasawa; Shigeru Tanaka, all of Kanagawa, Japan

[73] Assignee: Sumitomo Electric Industries, Ltd., Osaka, Japan

[21] Appl. No.: 658,868

[22] Filed: Feb. 22, 1991

[30] Foreign Application Priority Data

Feb. 28, 1990 [JP] Japan .................................. 2-48512

[51] Int. Cl.⁵ ............................................ B63B 35/04
[52] U.S. Cl. ......................... 254/134.3 FT; 254/134.4
[58] Field of Search .............. 254/134.3 FT, 134.3 R, 254/134.4

[56] References Cited

U.S. PATENT DOCUMENTS

| | | | |
|---|---|---|---|
| 4,691,896 | 9/1987 | Reeve | 254/134.4 |
| 4,941,774 | 7/1990 | Harmstorf | 405/158 |
| 4,948,097 | 8/1990 | Reeve et al. | 254/134.4 |
| 5,011,332 | 4/1991 | Kunze et al. | 254/134.3 FT |
| 5,022,634 | 6/1991 | Keeble | 254/134.4 |

FOREIGN PATENT DOCUMENTS 0108590 5/1984 European Pat. Off. .
0264767 4/1988 European Pat. Off. .
3340972 8/1985 Fed. Rep. of Germany .

Primary Examiner—Bruce M. Kisliuk
Assistant Examiner—Eileen Morgan
Attorney, Agent, or Firm—Cushman, Darby & Cushman

[57] ABSTRACT

The invention relates to an apparatus for laying an optical fiber unit with a pressure fluid into a previously laid duct line. Specifically, the apparatus performs this operation by a method for causing pressure fluid to flow backward into the guide tube on the feed side of the optical fiber unit so as to generate a buoyant force, so that the load due to the frictional force in the section between the feed side and the driving means can be much reduced. Accordingly, the method according to the present invention is particularly useful for pressure-sending an optical fiber unit into a duct line having insertion resistance, for example, a vertical duct line, a duct line having fine curves, or the like.

7 Claims, 4 Drawing Sheets

METHOD FOR LAYING OPTICAL FIBER UNIT AND APPARATUS THEREFOR

BACKGROUND OF THE INVENTION

1. Field of Invention

The present invention relates in general to an apparatus and method for laying optical fiber unit. More specifically, the invention relates to sending an optical fiber unit by pressure.

2. Description of Related Art

Japanese Patent Unexamined Publication No. Sho-59-104607 discloses a conventional method for laying an optical fiber unit into a previously laid duct. FIG. 2 (PRIOR ART) illustrates that method. An optical fiber unit 23 is fed through an optical fiber unit inlet-side seal portion 26 of a pressure-sending device 21 and from there sent by a driving device 25 toward a duct line 22. The duct line 22 is connected with an air tight seal to the pressure-sending device 21. Pressure fluid fed from a pressure fluid feed inlet 24 to the pressure-sending device is fed into the duct line 22. It is convenient to use air as the pressure fluid. Accordingly, the optical fiber unit 23 advanced into the duct line 22 is moved by the flow of the pressure fluid.

In such a conventional pressure-sending method, the seal portion 26 is provided on the optical fiber unit inlet-side of the pressure-sending device so as to prevent the pressure fluid from flowing backward. This results in the pressure fluid flowing toward the advancing direction of the optical fiber unit only.

One embodiment of the optical fiber unit to be used with the method of the present application is disclosed in the above-mentioned Publication and is an optical fiber unit with a foam layer. When a foam layer is used as an outer-layer coat, it has the advantageous characteristics of both being light-weight and having an extremely uneven surface. Such an uneven surface provides a wide surface area so that a large force of pressure can be used to advance the optical fiber unit through the duct.

However, it has been found that the prior art embodiment described above has the following problems.

(1) Although the conventional optical fiber unit having a foamed-body surface is advantageously light-weight and has an uneven surface, it is desirable, at the seal portion, to have an outer layer having little fluctuation in its outer diameter on the optical fiber unit inlet side, to maintain air-tightness in the pressure-sending device. It is difficult to maintain a consistent outer diameter at high accuracy on the optical fiber when the foamed-body surface is used. Thus, two opposing characteristics are required for the outer layer of the optical fiber unit: uneven surface and consistent outer diameter.

(2) When the method described above is used for the wiring in a building or the like, the weight alone of the optical fiber unit causes resistance. Also, since the wiring in a building has many curves, the optical fiber unit must sometimes be pulled up by traction through a duct line to an upper floor with the pressure-sending device attached. In this case, as shown in a longitudinal section of FIG. 3(A) and a cross section of FIG. 3(B), a problem arises in that the force F for fastening an optical fiber unit 31 against a wall surface in the inside of curved portions of a duct line 32 increases friction force between the optical fiber unit 31 and the inner wall of the duct line 32, so that the optical fiber unit 31 cannot be pulled up.

SUMMARY OF THE INVENTION

According to the present invention, the method for laying an optical fiber unit under fluid pressure into a previously laid duct line by means of a pressure-sending device having means for feeding the pressure fluid into the duct line and means for sending the optical fiber unit into the duct line, is characterized in that the pressure fluid is fed into the pressure-sending device and from there the pressure fluid flows not only to the duct line but to the inlet-side guide tube and the pressure fluid flows in the guide tube in the direction opposite to the advancing direction of the optical fiber unit.

The optical fiber unit laying apparatus for sending an optical fiber unit under fluid pressure from a feeding reel for storing the optical fiber unit to a previously laid duct line so as to lay the optical fiber unit, is characterized in that the apparatus comprises: a pressure-sending device into which the pressure fluid is fed from a source such as a compressor; a driving device for moving the optical fiber unit from the feeding reel through a guide tube into the pressure-sending device and on into the duct line; a connector connecting the duct line with the pressure-sending device; and another connector connecting the guide tube with the pressure-sending device.

DETAILED DESCRIPTION OF THE PREFERRED EMBODIMENTS

Referring to FIGS. 3(A), 3(B), 3(C), and 3(D), the operation of the invention will be described.

In the prior art, as shown in the vertical section 3(A) and the transverse section 3(B), as described above, when the optical fiber unit 31 is pulled up in the duct lines 32 having curves, force F for fastening the optical fiber unit 31 against the inside at the curved portions acts to thereby generate a large frictional force between the inner wall of the duct line and the optical fiber unit. In order to withstand the frictional force, a large traction force 33 is further required, so that the force F becomes larger and the friction force becomes extremely large. Accordingly, it becomes substantially impossible to propel the optical fiber unit through the duct line.

Figure 3A:
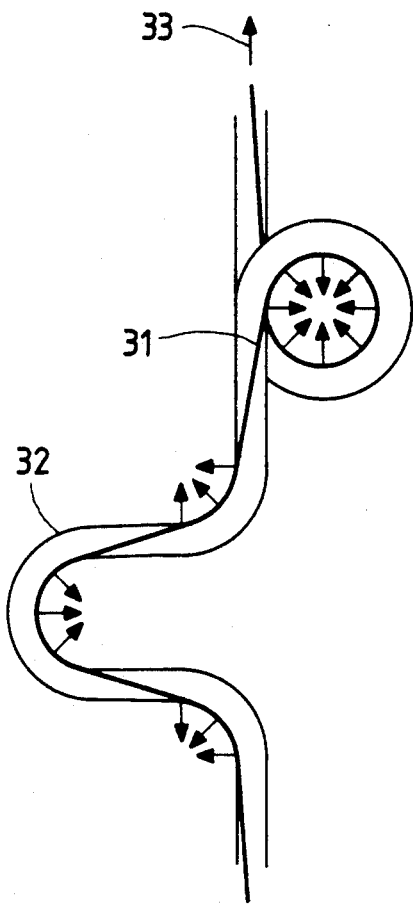
FIGS. 3A-3D are views for explaining the operation of the present invention compared with the conventional apparatus.
Figure 3C:
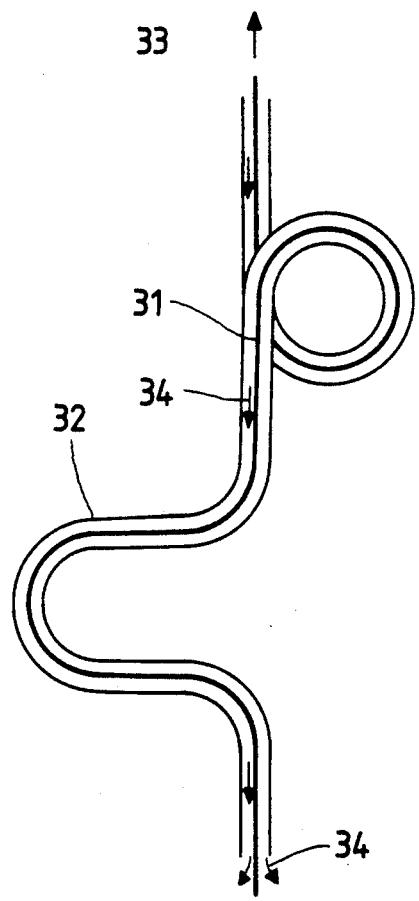
Figure 3B:
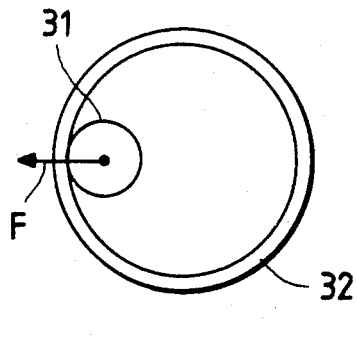
Figure 3D:
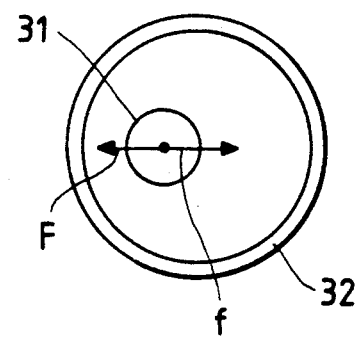

On the other hand, in the method according to the present invention, as shown in the longitudinal section of FIG. 3(C) and the transverse section of FIG. 3(D), buoyant force f for holding an optical fiber unit at the center of a duct line 32 is made to act by the fluid 34 flowing in the direction opposite to the advancing direction of the optical fiber unit 31 through the duct line. When the buoyant force f is suitable, the above force F and the buoyant force f are balanced with each other, so that the frictional force can be made extremely small. As a result, the optical fiber unit can be propelled with only a small traction force.

Figure 1:
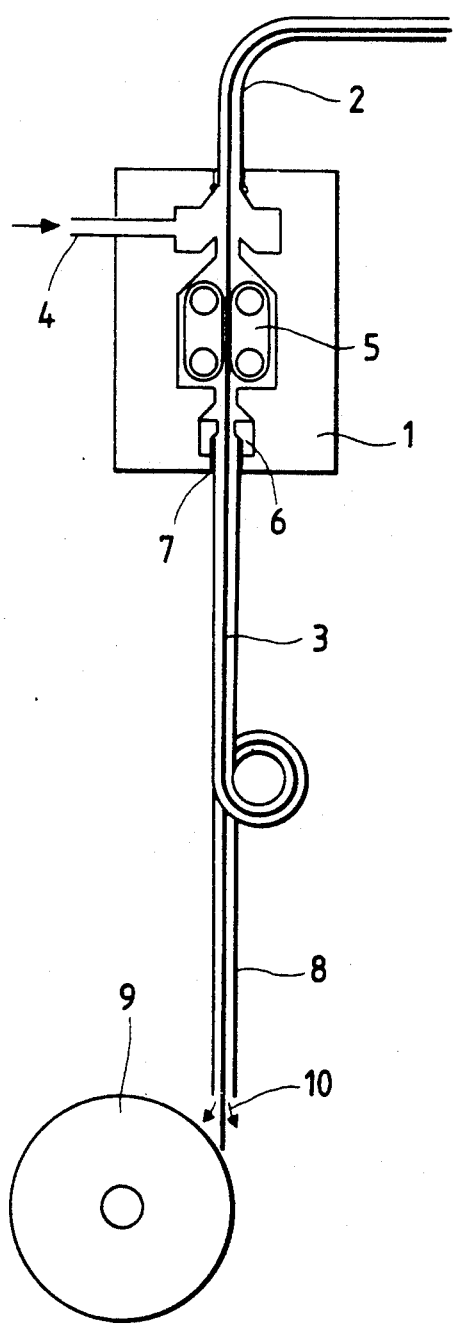
FIG. 1 is a sectional view for explaining an embodiment of the present invention.

FIG. 1 is a sectional view for explaining an embodiment of the present invention. In FIG. 1, the following parts are illustrated: a pressure-sending device 1; a duct line 2; an optical fiber unit 3; an inlet for feeding into the pressure-sending device a pressure fluid such as compressed air from a compressor or the like 4; a driving device 5; a seal portion on the optical fiber unit inlet side 6; an optical fiber unit inlet 7; a guide tube on the optical fiber unit feed side 8; a feeding reel 9; and a back-current fluid 10.

Figure 2:
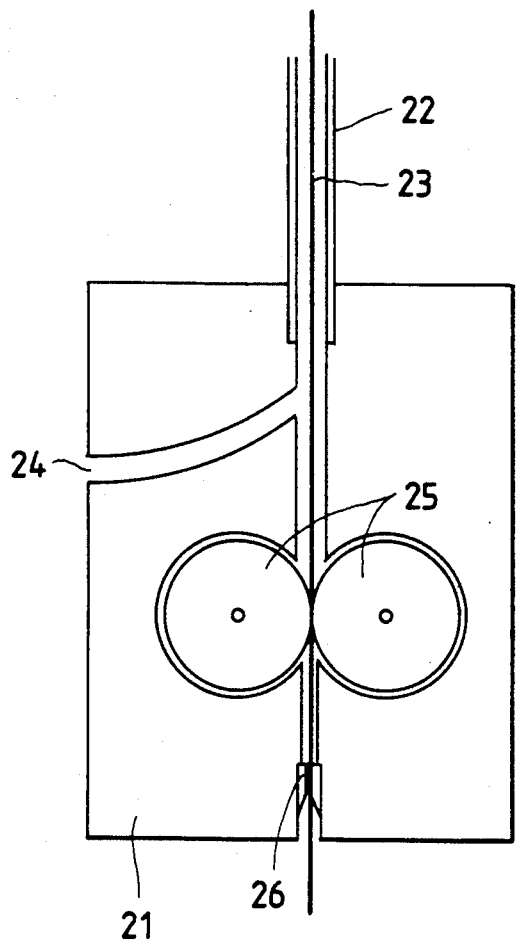
FIG. 2 (PRIOR ART) is a schematic view of a conventional pressure-sending device.

Similarly to the description of FIG. 2 (PRIOR ART), the optical fiber unit 23 is fed through the seal portion 26 on the optical fiber unit inlet side, sent by the driving device 25 toward the duct line 22 which is connected by an air tight seal to the pressure-sending device 21, and the optical fiber unit moves toward the duct line 22 with the help of a forward-moving pressure fluid fed from the pressure fluid feed inlet 24.

In addition, however, in this embodiment, an inlet-side guide tube 8 is provided on the inlet-side path from the feeding reel 9 to the pressure-sending device 1, and the inlet-side guide tube 8 is connected with an air-tight seal to the optical fiber unit inlet 7 of the pressure-sending device 1. Further, the seal portion 6 on the optical fiber unit inlet side of the pressure-sending device 1 provides a gap around the optical fiber unit through which a back-current of pressure fluid flows backward from the pressure-sending device to the inlet-side guide tube 8. Thus, the optical fiber unit 3 is drawn by the driving device 5 from the inlet-side guide tube toward the duct line while, at the same time, the optical fiber unit 3 is floated by the buoyant force generated by the back current.

Since the pressure fluid flows backward from the pressure-sending device 1 to the inlet-side guide tube, a pressure-sending force acts in the direction opposite to the advancing direction of the optical fiber unit 3. This force is however within the range, by several g/m, of the advancing force disclosed in the prior art publication cited above, and thus, the pressure-sending force can be sufficiently overcome by the advancing force of the optical fiber unit propelled by the driving device. Thus, the pressure of the backward flowing air can be as much as 10 kg/m$^2$ and still be within acceptable range of the advancing force. Further, since the buoyant force for drawing the optical fiber unit 3 to the center of the guide tube 8 acts in the feed-side section, the generated frictional force is small enough not to cause resistance against drawing the optical fiber unit 3 into the duct line 2, even if the feed-side section has some curves. The minimum pressure gradient of the backward flowing air needed to achieve a proper buoyancy is $$0.4 \cdot 10^{-3} \text{ kg/cm}^2/\text{m}.$$

As described above, in the cable laying method according to the present invention, the guide tube 8 is on the inlet side of the pressure-sending device, and the pressure fluid is caused to flow backward into the guide tube and to flow out from the end of the guide tube as the back-current fluid 10, so that the gap between the optical fiber unit and the seal at the seal portion 6 on the optical fiber unit inlet side of the pressure-sending device can be large, because air-tightness is not required.

Therefore, the present invention solves the problem (1) of the prior art described above. Further, even if a vertical duct line in a building is used as the guide tube of the optical fiber unit, the resistance due to the frictional force at the curved portions of the duct line is reduced by the buoyant force due to the fluid which flows backward, and the weight of the optical fiber unit alone can therefore be borne by the driving device. Accordingly, the problem (2) is also solved.

Figure 4:
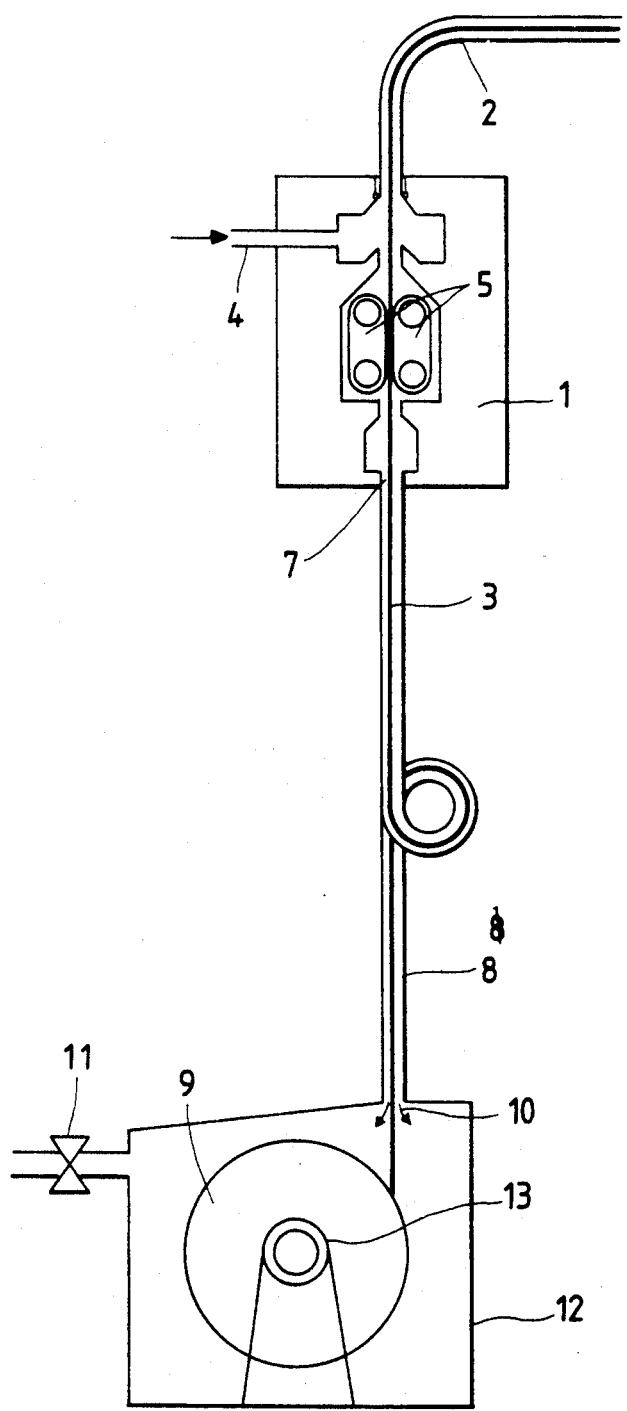
FIG. 4 is a sectional view of the pressure-sending device for explaining another embodiment of the present invention.

FIG. 4 is a sectional view for explaining another embodiment of the present invention. In the drawing, the portions which correspond to the FIG. 1 embodiment are assigned the same reference numbers as FIG. 1 and no further description of those portions will be given. In the FIG. 4 embodiment, a back-current fluid 10 flows backward through an inlet-side guide tube 8 to an end portion thereof which is connected to a box-like body 12 having a flow adjusting valve, so that the flow of the back-current fluid 10 can be adjusted. The adjustment can be performed more easily than the pressure adjustment performed at the seal portion on the optical fiber unit inlet side of the pressure-sending device. Accordingly, it is unnecessary to provide the seal portion as in FIG. 1. Further, a brake mechanism 13 may be provided on the feeding reel 9 so as to prevent excessive rotation due to inertia of the feeding reel.

Examples of the laying method according to the present invention will be described.

Figure 5A:
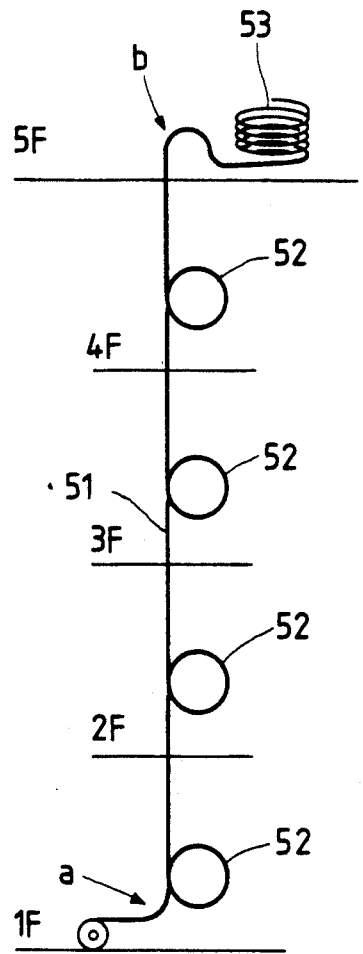
FIGS. 5A-5C and 6 are views for explaining specific laying methods.

FIG. 5(A) shows a simulation of piping in a building. A vertical duct line 51 having a height of 20 m simulates vertical wiring in the building. The vertical duct line 51 has four winding-up duct lines 52 each having a diameter of 40 cm which are disposed at intervals of 5 meters as a simulation of switchboards. The vertical duct line 51 is a tube of polyethylene having a total length of 25 m and an inner diameter of 6 mm.

A coiled duct line 53 of 300 m was connected to the vertical duct line 51 at its upper end so as to simulate a coiled duct line following the duct line in a floor system or the like. As the optical fiber unit, a 7-core optical fiber unit having a tight structure and an outer diameter of 2 mm was used, as described and disclosed in Extended Abstracts B-2-163 of the 1988 Autumn National Convention, the Institute of Electronics, Information and Communication Engineers of Japan.

As a comparative example, first, a conventional pressure-sending device in the form as shown in FIG. 2 was put at a position a (as shown in FIG. 5(A)) in the vicinity of the lowest portion, the optical fiber unit was inserted by use of compressed air with a pressure of 5 kg/cm$^2$. The result of sending the optical fiber unit by pressure was that the pressure-sending speed became lower than 10 m/minute at an optical fiber unit insertion distance of 200 m, and the insertion was stopped in the vicinity of the insertion distance of 300 mm.

Figure 5B:
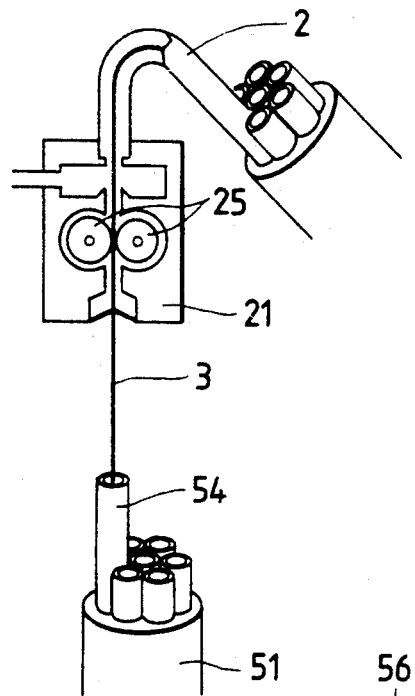
Figure 5C:
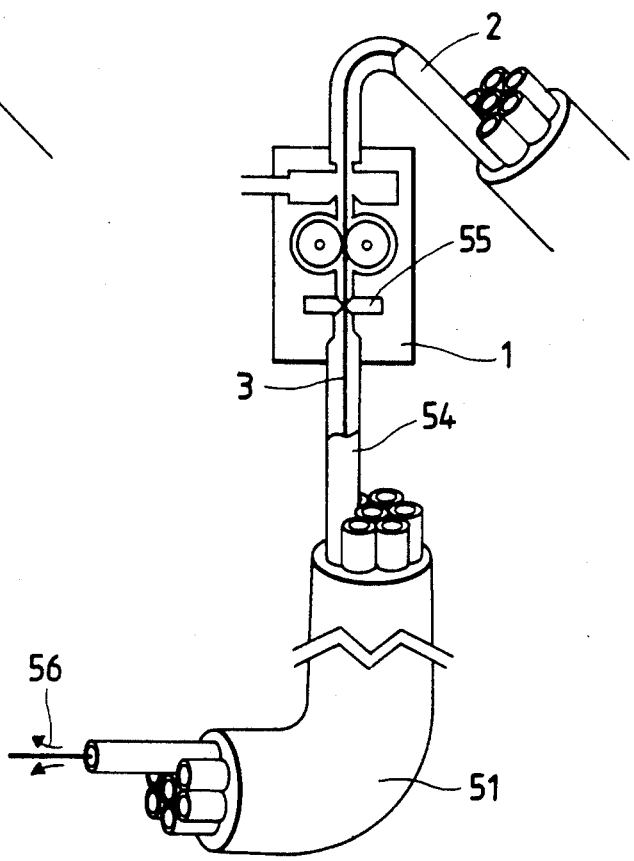

Next, a test was made with the above pressure-sending device being put at a position b (as shown in FIG. 5(A)) in the vicinity of the highest portion of the piping. As is shown in more detail in FIG. 5(B), a portion of the optical fiber unit 3 emerging from tube 54 at the top end of the vertical pipe path 51 is inserted into the lower portion of the pressure-sending device 21 so as to draw the optical fiber unit 3 by the driving device 25 using rollers. Even if the drawing speed was selected to be 5 m/minute, 2 m/minute, or 1 m/minute, the optical fiber unit could not be drawn up. It was found that the optical fiber unit 3 could not be inserted into the duct line 2 by this method.

Next, the pressure-sending device 1 shown in FIG. 1 as the embodiment of the present invention was incorporated at the position b, as shown in FIG. 5(A). At first, the optical fiber unit 3 was inserted from the position a to the position b in FIG. 5(A) by a conventional method of short length root pressure-sending. Then, after the top end of the optical fiber unit 3 was pinched by the driving device 5 using the rollers of the pressure-sending device 1 according to the present invention, the tube 54 of the vertical duct line 51 was connected to the pressure-sending device. Compressed air of 5 kg/cm$^2$ was fed into the pressure-sending device, and a back current 56 from the outlet on the feed side of the tube 54 of the vertical duct line was set to 15 l/minute, which in a tube with a 6 mm inner diameter results in a speed of flowing air at the outlet of 530 m/minute. As a result, the insertion of the optical fiber unit in the floor system of 300 m was smoothly performed and completed in 18 minutes. The optical fiber unit was drawn up, without any problem, through the vertical duct line in the guide tube on the feed side.

Figure 6:
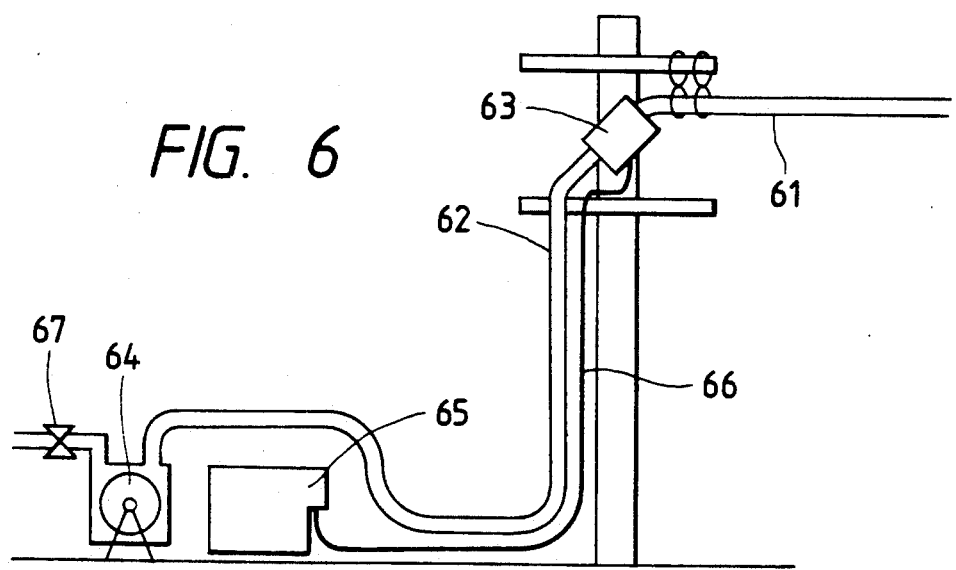

Further, as shown in FIG. 6, in the case where an optical fiber unit is laid in an aerial duct line 61, a feeding reel 64 is positioned far from a pressure-sending device 63, so that the optical fiber unit is fed by pressure through a guide tube 62. Accordingly, the optical fiber unit can be laid in the aerial duct line with no external damage. Also shown in FIG. 6 is a compressor 65, a compressed-air feeding pipe 66, and a valve 67 for adjusting the flow of the backward-flowing fluid.

If an optical fiber unit feeding reel is housed in a box-like vessel 12 as shown in FIG. 4, the optical fiber unit can be usefully protected from wind, rain, and other external influences.

It has also been observed that the present invention operates well within a range of temperatures from −40° C. to 80° C.

As shown in FIG. 6, the guide tube 62 between the feeding reel and the pressure-sending device may be a permanent duct line which will continue to be used as an optical cable after the duct line 62 has been laid, or may be a guiding duct line for temporarily guiding the optical fiber unit to the correct starting position only at the time when the unit is originally laid.

What is claimed is:

1. A method for laying an optical fiber unit through a duct line comprising the steps of:
   drawing said optical fiber unit from a feeding reel through a guide tube and a pressure-sending device into a duct line by a driving device;
   directing a gas under pressure from said pressure-sending device into said duct line co-current with the advancing direction of said optical fiber unit; and
   directing a gas under pressure from said pressure-sending device into said guide tube counter-current from the advancing direction of said optical fiber unit.

2. An optical fiber unit laying apparatus comprising:
   feeding reel for storing an optical fiber unit;
   a pressure-sending device for simultaneously sending gas under pressure in a co-current direction with an advancing optical fiber unit into a duct line and in a counter-current direction from the advancing optical fiber unit into a guide tube;
   a guide tube in open fluid communication with the pressure-sending device and extending away from said pressure-sending device toward the feeding reel;
   duct line in open fluid communication with the pressure-sending device and extending away from the pressure-sending device in the direction of the advancing optical fiber unit; and
   an optical fiber unit driving device for driving said optical fiber unit from said guide tube to said duct line.

3. The optical fiber unit laying apparatus according to claim 2 wherein said guide tube is in open fluid communication with a box-like body which surrounds said feeding reel.

4. The optical fiber unit laying apparatus according to claim 3 wherein said box-like body is provided with an adjustable valve.

5. The optical fiber unit laying apparatus according to claim 2 wherein the connector between said guide tube and said pressure-sending device is a narrow neck which limits fluid flow between the pressure-sending device and the guide tube.

6. The optical fiber unit laying apparatus according to claim 2 wherein said pressure-sending device is in open fluid communication with a compressor.

7. An optical fiber unit laying apparatus comprising:
   a feeding reel for storing an optical fiber unit;
   a pressure-sending device for sending pressure fluid into a duct line and a guide tube;
   a guide tube in open fluid communication with the pressure-sending device and extending away from said pressure-sending device toward the feeding reel;
   a duct line in open fluid communication with the pressure-sending device and extending away from the pressure-sending device in the direction of an advancing optical fiber unit; and
   an optical fiber unit driving device for driving said optical fiber unit from said guide tube to said duct line;
   wherein said guide tube is in open fluid communication with a box-like body which surrounds said feeding reel and wherein said box-like body is provided with an adjustable valve.

* * * * *